(12) United States Patent
Bates et al.

(10) Patent No.: US 6,822,693 B2
(45) Date of Patent: Nov. 23, 2004

(54) TELEVISION TUNER THAT CHANGES THE RENDERING OF A DIGITAL TELEVISION BROADCAST ACCORDING TO INFORMATION DISPLAYED ON A SCOREBOARD DURING A SPORTING EVENT

(75) Inventors: Cary Lee Bates, Rochester, MN (US); Eric Lawrence Barsness, Pine Island, MN (US); Mahdad Majd, Rochester, MN (US); John Matthew Santosuosso, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 499 days.

(21) Appl. No.: 09/746,374

(22) Filed: Dec. 23, 2000

(65) Prior Publication Data
US 2002/0080275 A1 Jun. 27, 2002

(51) Int. Cl.[7] .................................................. H04N 5/44
(52) U.S. Cl. .......................... 348/553; 348/731; 348/563
(58) Field of Search ................................. 348/465, 468, 348/473, 474, 460, 563, 553, 731; 725/39; H04N 5/44, 5/50

(56) References Cited

U.S. PATENT DOCUMENTS

| | | | | |
|---|---|---|---|---|
| 5,592,551 A | * | 1/1997 | Lett et al. | 380/211 |
| 6,038,368 A | * | 3/2000 | Boetje et al. | 386/52 |
| 6,169,543 B1 | * | 1/2001 | Wehmeyer | 348/906 |
| 6,177,931 B1 | * | 1/2001 | Alexander et al. | 348/906 |
| 6,356,969 B1 | * | 3/2002 | DeKoning et al. | 710/261 |
| 6,388,714 B1 | * | 5/2002 | Schein et al. | 348/563 |

* cited by examiner

Primary Examiner—John Miller
Assistant Examiner—Trang U. Tran
(74) Attorney, Agent, or Firm—Martin & Associates, LLC (57) ABSTRACT

A television tuner and method monitor a scoreboard during a television sporting event and affect the viewing and/or recording of the sporting event according to information on the scoreboard. For example, the presentation of the sporting event may be affected according to the scoreboard by muting the volume or blanking the screen whenever the clock on the scoreboard is not running. In another example, the tuner and method control the recording of a television sporting event according to information on the scoreboard. A recorder could be paused whenever the clock is not running and resumed when the clock starts, thereby automatically skipping all commercials and all commentary when the clock is not running. In yet another example, the tuner and method control the presentation of a previously-recorded sporting event according to information on the scoreboard. A recorded sporting event could be filtered to display only the portions that contain a scoreboard the satisfied specified criteria. One specific example of this would allow viewing only the last two minutes of each half, viewing only the plays that resulted in a penalty; or viewing only the plays that resulted in a score. The preferred embodiments thus provide a tuner that alters the recording or presentation of a television sporting event according to information displayed on a scoreboard.

16 Claims, 6 Drawing Sheets

TELEVISION TUNER THAT CHANGES THE RENDERING OF A DIGITAL TELEVISION BROADCAST ACCORDING TO INFORMATION DISPLAYED ON A SCOREBOARD DURING A SPORTING EVENT

BACKGROUND OF THE INVENTION

1. Technical Field

This invention generally relates to television broadcasting and more specifically relates to broadcasting of sporting events.

2. Background Art

For many decades, television has been an important part of life in the United States, providing countless hours of news, movies, and various other forms of entertainment. Analog television has been the standard for many years, where local television stations broadcast signals in the UHF frequency band that are received by a television antenna on a television. The television includes a tuner that discriminates among the many television channels in the broadcast and displays a selected channel on the television screen.

More recently, digital television has gained popularity due to its higher resolution and better transmission quality. Small satellite dishes can now be used to receive digital satellite transmissions of television programs. DirectTV and Dish Network are two companies that provide digital television service via small satellite dishes. In addition, cable television companies now offer digital channels as well.

Watching sporting events on television has become a pastime and even an obsession for a large number of sport fans in the United States. Most live sporting events have time-outs, half-time, and other breaks that allows the broadcaster to broadcast commercials or comment by the network broadcasting crew. Thus, an NFL football game on Monday night may only have 60 minutes of playing time (four 15 minute quarters), but the actual broadcast may last three hours or more. Sometimes a fan may want to perform other tasks while watching the sporting event. For example, maybe a person needs to write checks to pay bills when the action in the game stops, but wants to watch the game when the action is going on. With current televisions, the user must either listen to the commentary and commercials between plays, or must manually mute the television volume between plays. The problem with this approach is that, after muting the sound, the user must visually look up to monitor the television picture from time to time to see if the game action has resumed to manually unmute the sound to continue watching the game as it is played.

Another problem with current television broadcasts of sporting events is the inability to automatically discriminate between play time and time that play is not occurring. As a result, when a sporting event is recorded for later viewing, the commentary and commercials are included because there is no way for the recorder to tell the difference between play action and time between plays. In addition, once the game with commentary and commercials is recorded, the viewer must then manually fast-forward through any parts where play is not occurring if the viewer only wants to watch the action portions of the game. Without a way for a user to alter the presentation or recording of a sporting event according to when play is actually occurring, users will continue to be frustrated by attempting to manually filter out unwanted pauses between play, and will have no way to view only specified portions of interest when replaying a recording of the sporting event.

DISCLOSURE OF INVENTION

According to the preferred embodiments, a television tuner and method monitor a scoreboard during a television sporting event and affect the viewing and/or recording of the sporting event according to information on the scoreboard. For example, the presentation of the sporting event may be affected according to the scoreboard by muting the volume or blanking the screen whenever the clock on the scoreboard is not running. In another example, the tuner and method control the recording of a television sporting event according to information on the scoreboard. A recorder could be paused whenever the clock is not running and resumed when the clock starts, thereby automatically skipping all commercials and all commentary when the clock is not running. In yet another example, the tuner and method control the presentation of a previously-recorded sporting event according to information on the scoreboard. A recorded sporting event could be filtered to display only the portions that contain a scoreboard the satisfied specified criteria. One specific example of this would allow viewing only the last two minutes of each half; viewing only the plays that resulted in a penalty; or viewing only the plays that resulted in a score. The preferred embodiments thus provide a tuner that alters the recording or presentation of a television sporting event according to information displayed on a scoreboard.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

The preferred embodiments herein disclose a digital television tuner and method that includes a user interface that allows a user to specify preferences relating to the scoreboard, and that processes the digital television signal in accordance with specified preferences and renders the digital television signal in accordance with the information on the scoreboard and the specified preferences. One example of the preferred embodiments allows a user to specify that the audio of the television will be muted whenever the clock on the scoreboard is not running. This allows a user to automatically hear the audio portion of the broadcast for each play (when the clock is running), while automatically muting the audio between plays (when the clock is not running).

Figure 1:
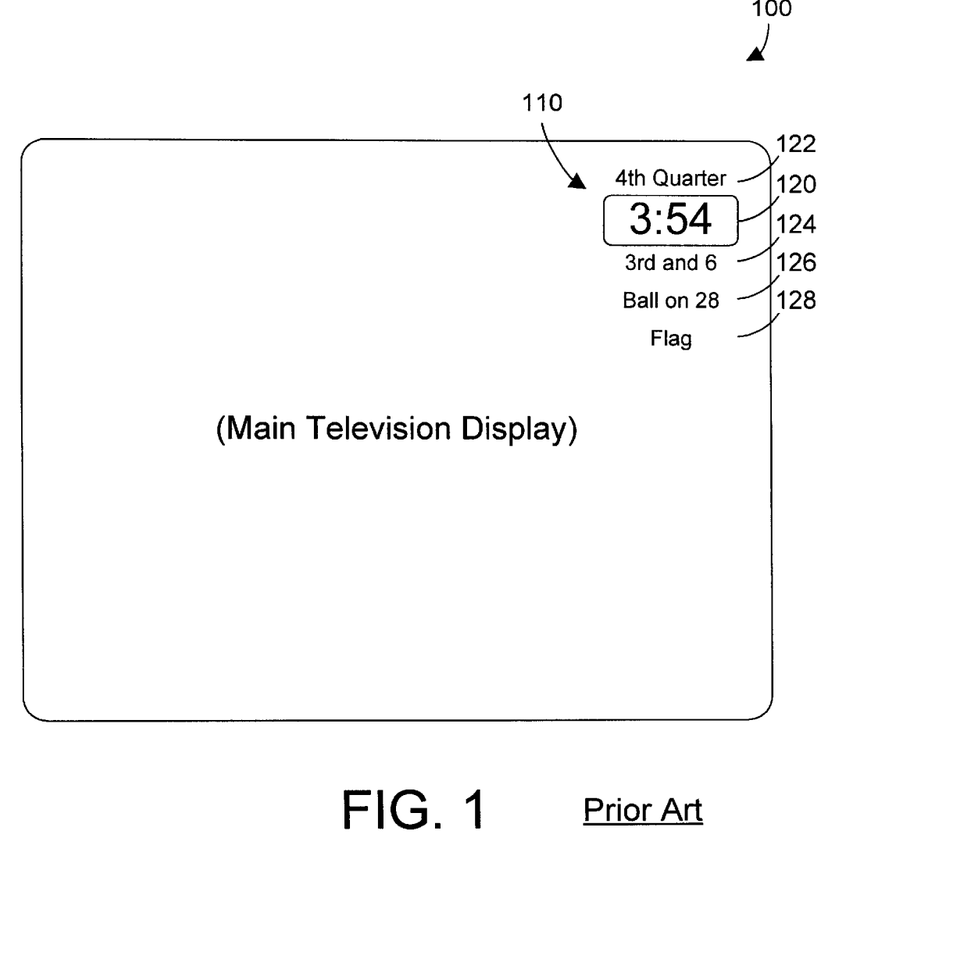
FIG. 1 is a front view of a prior art television display that includes scoreboard information.

Referring to FIG. 1, a prior art television display 100 is shown. We assume that the television display 100 of FIG. 1 is displaying the broadcast of a sporting event that includes a scoreboard 110 in the upper right corner, as shown. Scoreboard 110 can contain any suitable information relating to any sporting event. For the discussion herein, we assume the specific example of an NFL football game broadcast. For this example, the scoreboard might include a game clock 120, a quarter indication 122, a down and yardage indication 124, a yard line indication 126, and a penalty flag indication 128. Most of the broadcasters that air NFL football games now include a scoreboard as part of the display whenever the game is being played that includes some or all of the information shown on the scoreboard 110 of FIG. 1.

Figure 2:
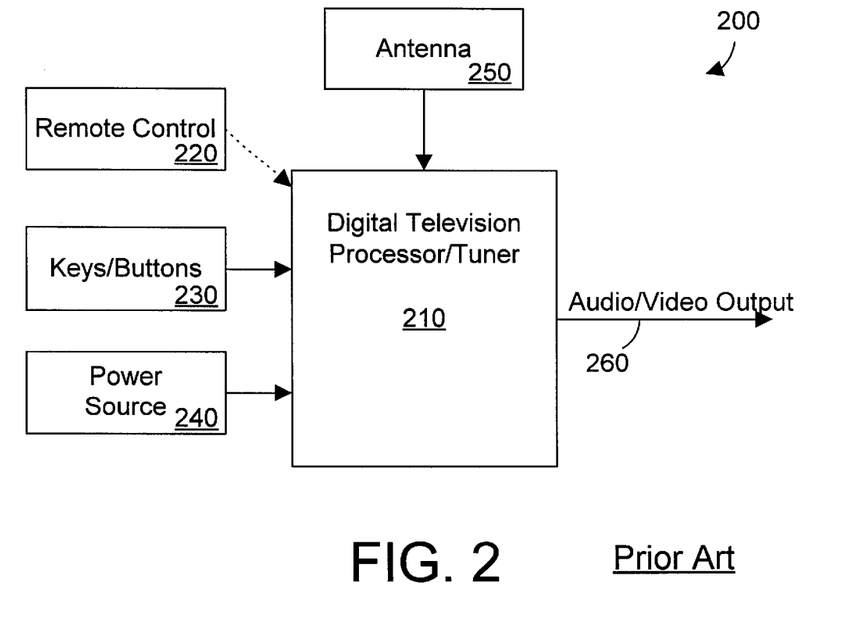
FIG. 2 is a block diagram of a prior art digital television tuner.

Referring to FIG. 2, a prior art apparatus 200 includes a digital television processor/tuner 210 (hereinafter "tuner 210"), a remote control 220, keys/buttons 230, a power source 240, an antenna 250, and an audio/video output 260. Remote control 220 is a wireless remote control that is commonly known in the art, that can control the channel, volume, etc. that is output by tuner 210. Keys/buttons 230 are the control inputs on the front panel of the apparatus that allow changing the function of the tuner 210. The power source 240 is any suitable power source. For stationary television tuners, the preferred power source is line power received from plugging a power cord into a standard power receptacle. For portable television tuners, the preferred power source is DC power from one or more batteries. Antenna 250 is any suitable antenna for receiving digital television signals, whether now known or developed in the future. A small digital satellite dish such as those known in the art is one example of a suitable antenna 250.

The tuner 210 typically receives the digitally-encoded television signal, decodes it, and outputs an audio/video output 260. If the tuner 210 is in a television, the audio/video output 260 may go directly to a display and one or more speakers. If the tuner 210 is in a video recorder, the audio/video output 260 would likely be connected to the audio/video input of a television. Most of the functions of tuner 210 are known, and are therefore not discussed herein in any detail.

Sun Microsystems has developed a method known as Java TV for processing and displaying a digital television signal that has a defined format. Java TV is a trademark of Sun Microsystems. The reader may refer to the Sun Microsystems web site at www.sun.com for additional information regarding Java TV. Java TV is one suitable format for processing data included in a digital television transmission that could be used in accordance with the preferred embodiments herein.

Figure 3:
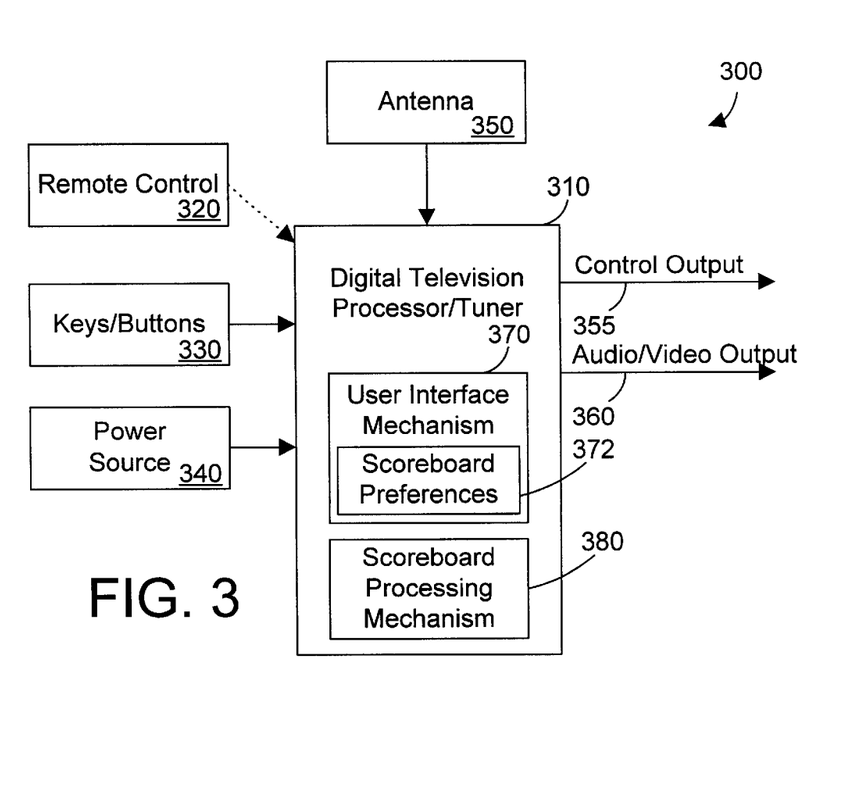
FIG. 3 is a block diagram of a digital television tuner in accordance with the preferred embodiments.

Referring now to FIG. 3, an apparatus 300 in accordance with the preferred embodiments includes a remote control 320, keys/buttons 330, a power source 340, and an antenna 350. In the preferred embodiments, each of 320, 330, 340 and 350 are suitably the same as their prior art counterparts 220, 230, 240 and 250, respectively (in FIG. 2), as described above. Note, however, that it is equally within the scope of the preferred embodiments to include a remote control 320, keys/buttons 330, a power source 340, and an antenna 350, or any of these individually, that is different from the prior art counterparts shown in FIG. 2.

Tuner 310 includes many of the same functions as prior art tuner 210 shown in FIG. 2, including the processing and decoding of a digital television signal, and outputting the decoded signal on an audio/video output 360. Note, however, that in addition to the known prior art functions, tuner 310 also includes a user interface mechanism 370 and a scoreboard processing mechanism 380. User interface mechanism 370 allows a user to input one or more scoreboard preferences 372. The scoreboard preferences include action triggers that cause an action to occur, along with the specification of the appropriate action for each action trigger. Scoreboard processing mechanism 380 then uses the scoreboard preferences 372 to provide certain actions specified by the user when an action trigger occurs. Note that tuner 310 includes a control output 355 that may be driven by scoreboard processing mechanism 380 to indicate to external devices or equipment that particular actions are required. One suitable example of the user of control output 355 would allow a set-top box that includes tuner 310 to pause/resume the recording of a digital television broadcast by an external digital recorder by using the control output 355 to pause/resume the recording action of the digital recorder.

Figure 4:
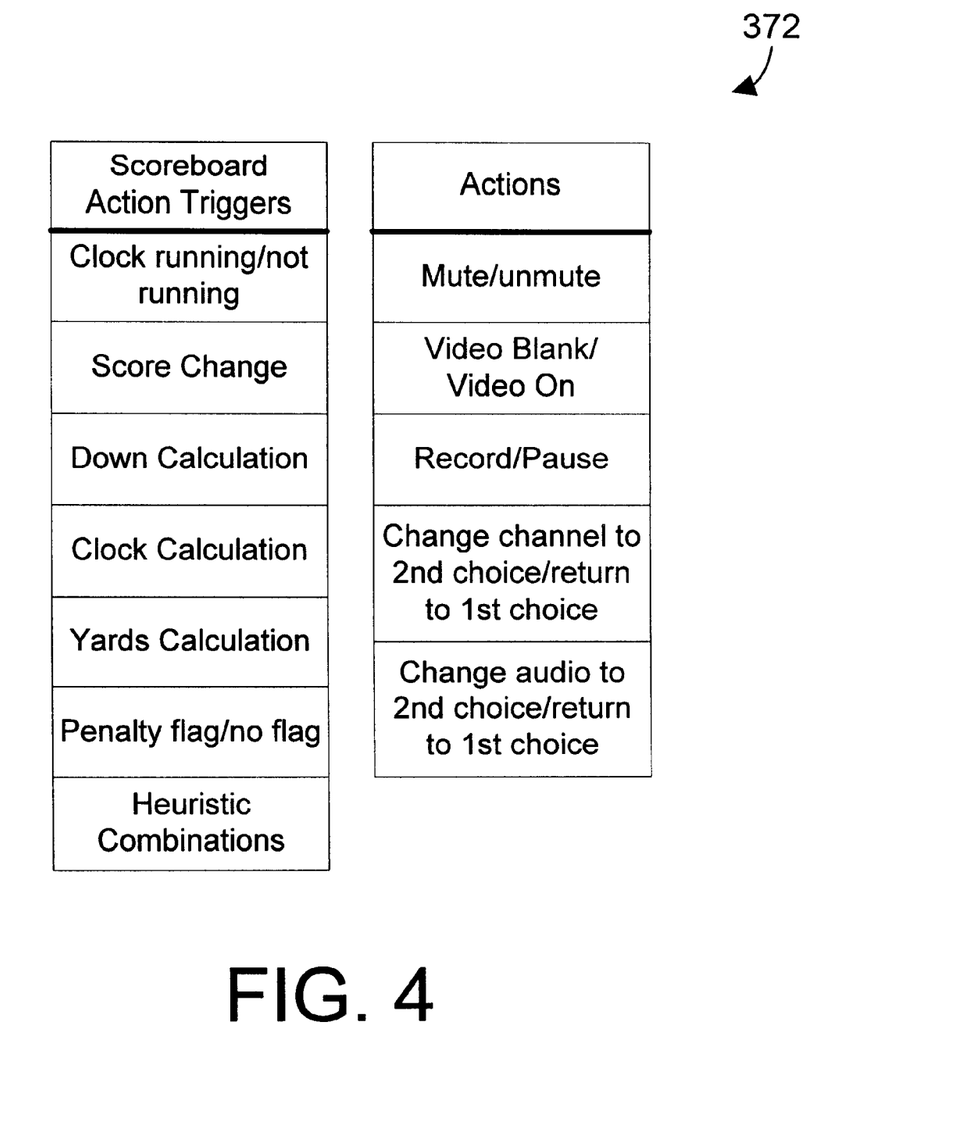
FIG. 4 is a chart showing various scoreboard action triggers and actions that could be applicable to a specific example of an NFL football broadcast.

Referring to FIG. 4, some suitable scoreboard preferences for the specific example of an NFL football game are shown. Examples of suitable action triggers for an NFL football scoreboard include: clock running/not running; score change; down calculation; clock calculation; yards calculation; penalty flag/no flag; and any heuristic combination of these action triggers. Examples of suitable actions that may be prompted by any of the action triggers is to mute/unmute the broadcast audio; blank/unblank the broadcast video; initiate/pause recording of the broadcast signal; automatically change the channel from the first choice station to a second choice station, then back to the first; and automatically changing the audio portion of the broadcast from a first choice to a second choice, then back to the first. The action of changing from a first choice station to a second choice station allows the tuner to automatically surf to another channel based on scoreboard criteria, and to automatically return when the game action resumes. The action of changing between the first and second audio portions allows the tuner to play audio from a specified audio source (such as a radio statio or CD) based on scoreboard criteria, and to change back to the channel audio when the game action resumes. The examples below illustrate how some of these action triggers and actions may be specified to control the rendering of a digital television broadcast of a sporting event.

Let's say that a male college student has homework to do, and really needs to get his homework done, but also really wants to watch the live broadcast of his favorite team while doing his homework. The student could specify a scoreboard preference that the volume is muted whenever the clock in the scoreboard is not running. In this manner, the student may study when the audio is muted, and look up to watch only when he hears the audio resume (which occurs when the clock begins to run again). In this manner the tuner 310 provides automatic muting of the volume whenever the clock is not running, allowing the busy college student to accomplish both of his goals of studying and watching the game at the same time.

In another example, let's assume that a user has recorded the digital television broadcast of a sporting event. The user is now ready to watch the recorded game, but doesn't have time to leisurely watch all of the game, including all of its commercials and commentary. The user can simply enter a scoreboard preference using the clock running/not running trigger that specifies that only the portions of the game with the clock running are displayed, allowing the tuner to automatically skip all parts of the game when the clock is not running. Using the score change trigger, the user may specify that only the plays that result in a score change be shown. Using the down calculation trigger, the user may specify that only first downs be shown, or only fourth downs. Using the clock calculation trigger, the user may specify that only the final four minutes of the game should be shown. Using the yards calculation trigger, the user could specify that only plays inside the 30 yard line should be shown. Using the penalty flag/no flag trigger, the user could specify that only the plays with penalties are shown. And using the heuristic combination trigger, the user could specify any suitable combination of triggers. For example, the user could specify that only portions with the clock running during third downs that resulted in a penalty be shown.

The action triggers shown in FIG. 4 are for an NFL football game. Of course, other triggers for an NFL football game could also be used, and other triggers will be appropriate for other sports. The action triggers herein expressly extend to any and all suitable triggers that could be derived from information that could be displayed on a scoreboard, whether or not this information is currently known to be displayed on a scoreboard. In other words, an NFL scoreboard could include the name or jersey number of the offensive player that just handled the ball, and an appropriate trigger action would be to display only those plays for a specified offensive player, even though current scoreboards do not display this information. The action triggers and actions in FIG. 4 are intended to illustrate examples of many different types of triggers and actions that could be used for an NFL football game broadcast, and should not be construed as limiting the scope of the claimed invention. As stated above, virtually any and all information regarding any sporting event that may be displayed on a scoreboard of any kind may be used as an action trigger to trigger an appropriate action. Note also that the preferred embodiments expressly extend to action triggers that are based on information in the digital television broadcast that is not displayed on a scoreboard.

Figure 5:
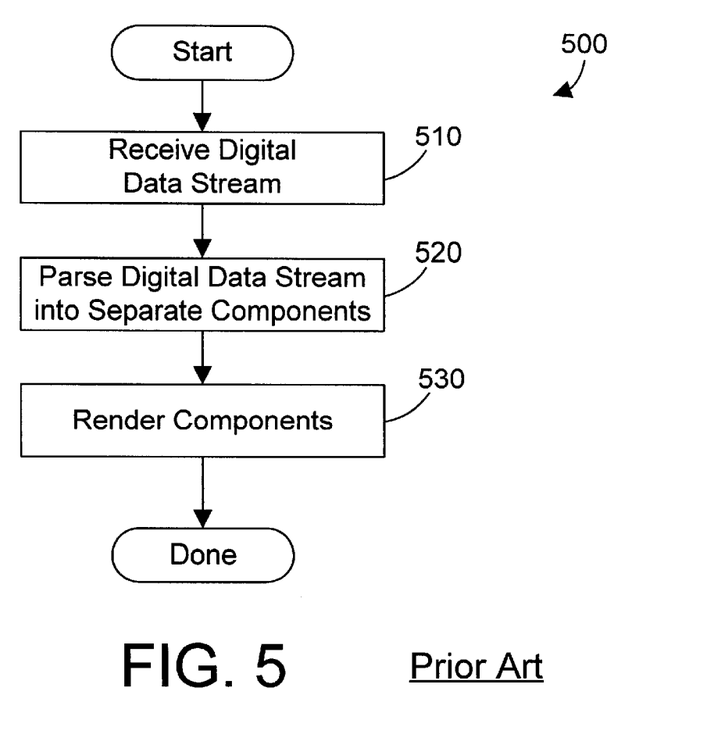
FIG. 5 is a flow diagram of a prior art method for processing and rendering a digital television broadcast.

Referring now to FIG. 5, a prior art method 500 for processing and displaying a digital television broadcast begins by receiving the digital data stream (step 510). The digital data stream is parsed into its constituent components (step 520), and these components are then rendered (step 530). Because the components in a digital television broadcast are both audio and visual, a component is said to be "rendered" (or presented) to the user, which is a generic way of saying that a visual component is displayed, and an audio component is sent to the audio output.

Figure 6:
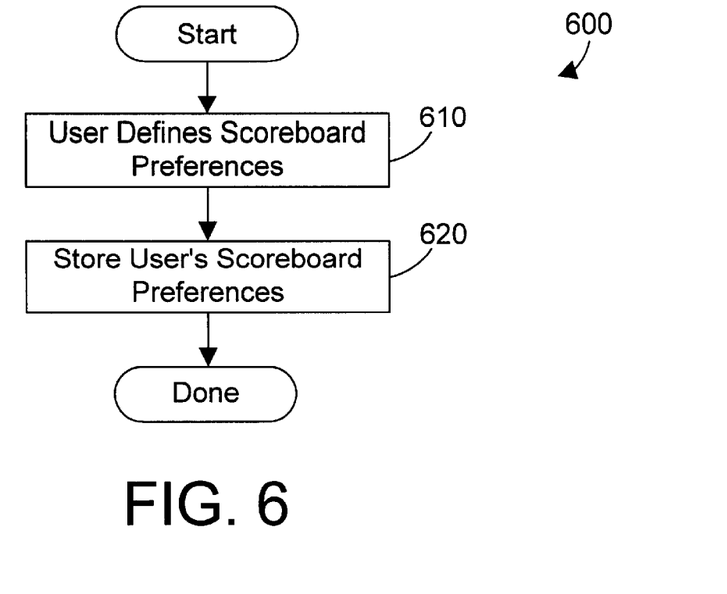
FIG. 6 is a flow diagram of a method in accordance with the preferred embodiments for defining and storing a user's scoreboard preferences.

FIG. 6 shows a method in accordance with the preferred embodiments for a user to set scoreboard preferences for rendering a sporting event. First, the user specifies scoreboard preferences (step 610). As discussed above, a scoreboard preference generally includes one or more action triggers and one or more corresponding actions to take when the trigger conditions are met. Next, these scoreboard preferences are stored (step 620), as shown as 372 in FIG. 3. Once these scoreboard preferences are stored, they can be used to affect how a broadcast is rendered to a user.

Figure 7:
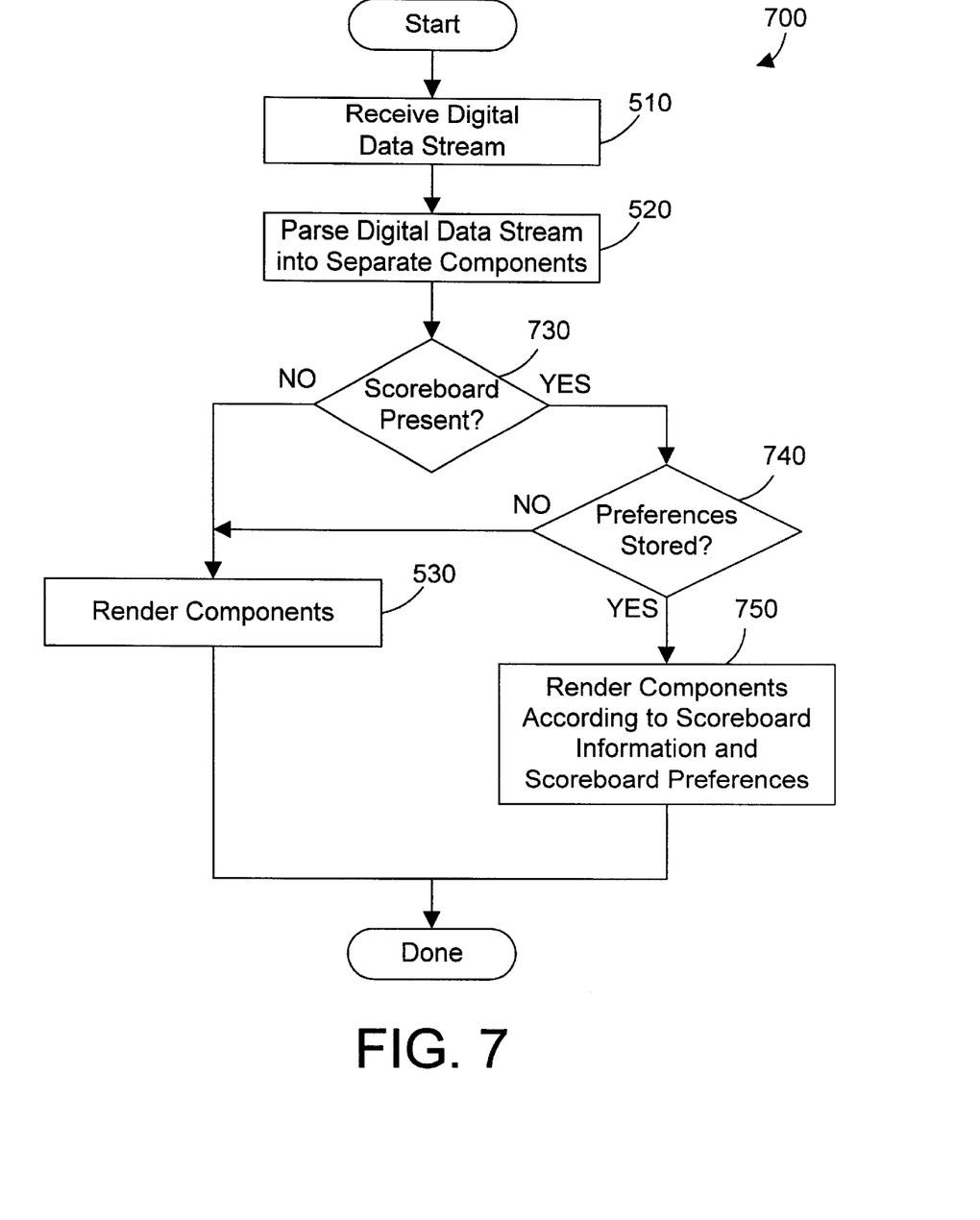
FIG. 7 is a flow diagram of a method for processing a digital television data stream in accordance with the preferred embodiments.

Referring to FIG. 7, a method 700 for processing a digital television broadcast in accordance with the stored scoreboard preferences begins by receiving the digital data stream (step 510). The digital data stream is parsed into separate components (step 520). If a scoreboard is present in the components of the received data stream (step 730=YES), and if there are scoreboard preferences stored (step 740=YES), the components are rendered according to the scoreboard information and the stored scoreboard preferences (step 750). One suitable implementation for a scoreboard is a Java applet, and step 730 in this implementation would simply monitor to see if a Java applet that corresponds to a scoreboard is present. If there is no scoreboard present (step 730=NO), or if there are no scoreboard preferences stored (step 740=NO), the components are rendered (step 530) without any special actions taken. In the preferred embodiments, steps 510, 520 and 530 of FIG. 7 are suitably the same as the prior art steps of the same numbers in FIG. 5. Note that the digital data stream is received piecemeal rather than all at once, which means that method 700 will be repeated as required for each component or group of components received.

Figure 8:
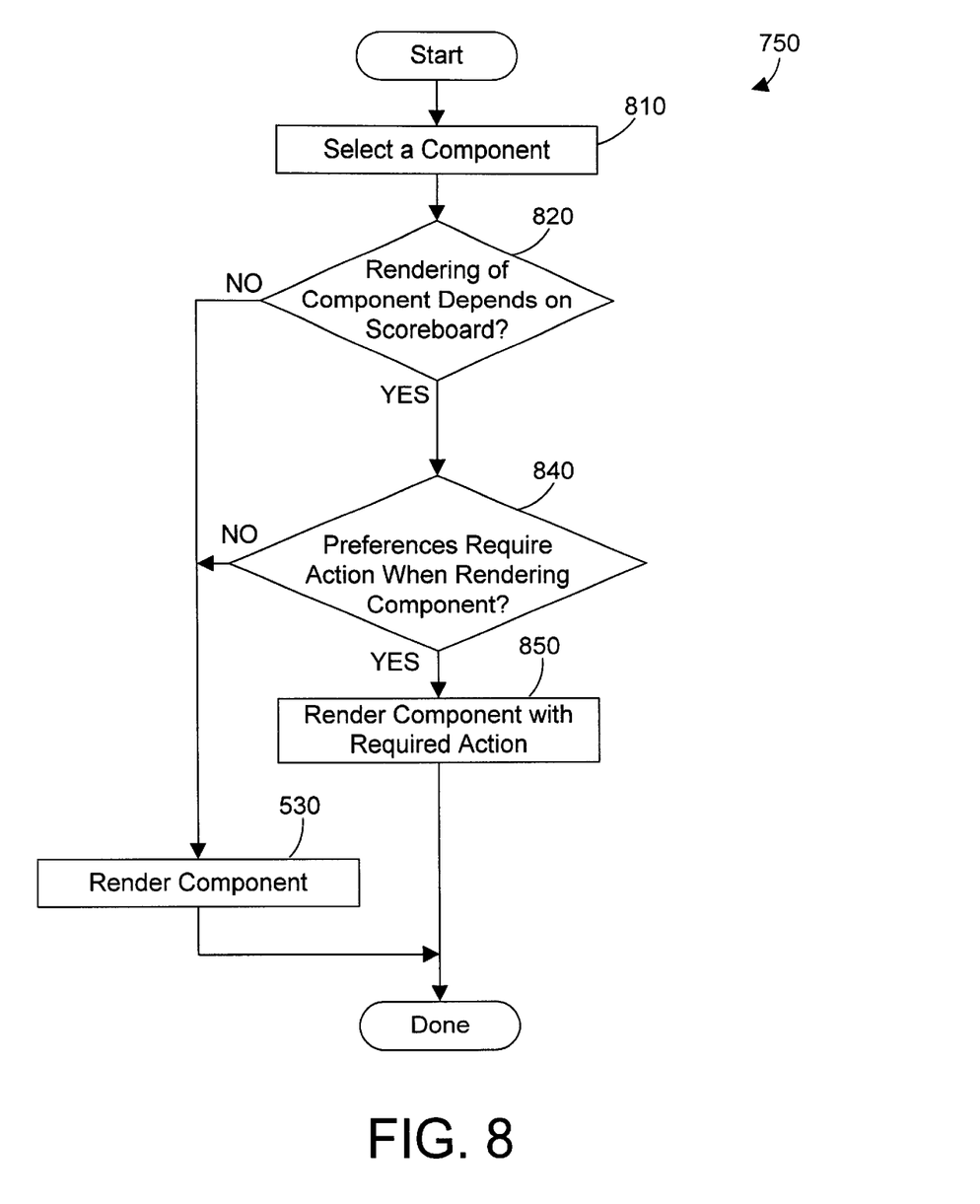
FIG. 8 is a flow diagram of a method for performing step 750 of FIG. 7 in accordance with the preferred embodiments.

Referring now to FIG. 8, one specific method for implementing step 750 of FIG. 7 is shown. First, a component is selected (step 810). If rendering of the component does not depend on scoreboard information (step 820=NO), the component is rendered (step 530). If, however, the rendering of the component depends on information in the scoreboard (step 820=YES), step 840 then determines whether the scoreboard preferences require action when rendering the component. If not (step 840=NO), the component is rendered (step 530). If the scoreboard preferences and the current scoreboard information require some action when rendering the component (step 840=YES), the component is rendered with the required action (step 850). Step 750 of FIG. 8 is repeated for each component that needs to be processed.

The preferred embodiments disclosed herein greatly improve the convenience of watching a live or recorded digital broadcast of a sporting event by giving the user control over how the sporting event is rendered according to information in the scoreboard. The user can thus mute the audio whenever the clock is not running. When watching a recorded digital broadcast of a sporting event, various action triggers and their heuristic combinations are possible to precisely control what portions of the sporting event are rendered to the user. The preferred embodiments thus give the user much greater control over how a sporting event is rendered, both in live broadcasts and in digitally recorded reproductions of a broadcast.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention. For example, the examples of the preferred embodiments discussed herein process a digital television transmission for a specific component that corresponds to a scoreboard. However, other techniques within the scope of the preferred embodiments may recognize the presence of a scoreboard in an analog television broadcast by digitizing a snapshot of the analog signal, scanning it for a scoreboard, and monitoring the scoreboard area to detect changes in information presented on the scoreboard. This and other variations are within the scope of the preferred embodiments.

We claim:

1. A television tuner comprising:
a digital television processor that receives a digital television transmission that includes a plurality of digital components, the digital television processor including:
a user interface mechanism that allows a user to define at least one scoreboard preference that specifies at least one trigger and at least one corresponding action to be taken when particular information is present on a scoreboard that is included as one of the plurality of digital components;
a scoreboard processing mechanism that analyzes the plurality of digital components and that renders the plurality of digital components according to the at least one scoreboard preference and information on the scoreboard.

2. The television tuner of claim 1 wherein the scoreboard comprises a Java applet.

3. The television tuner of claim 1 wherein the scoreboard processing mechanism mutes an audio signal when rendering at least one of the plurality of components.

4. The television tuner of claim 1 wherein the scoreboard processing mechanism causes recording of the digital television transmission to pause and resume based on scoreboard information.

5. The television tuner of claim 1 further comprising a control output that affects that rendering of the digital television transmission according to the at least one scoreboard preference and the information on the scoreboard.

6. The television tuner of claim 1 wherein the television tuner is part of a television set.

7. The television tuner of claim 1 wherein the television tuner is part of a television recording apparatus.

8. The television tuner of claim 1 wherein the television tuner is part of a digital receiver box that may be coupled to a television set.

9. The television tuner of claim 1 wherein the scoreboard information includes a clock.

10. The television tuner of claim 1 wherein the at least one trigger is selected from the first group:
clock running;
clock not running;
and wherein the corresponding action is selected from the second group:
mute;
unmute;
video blank;
video on;
record;
pause;
change channel;
return to selected channel;
change audio source;
return to selected audio source.

11. The television tuner of claim 10 wherein the first group further comprises:
score change;
down calculation;
clock calculation;
yards calculation;
penalty flag;
no penalty flag; and
at least one heuristic combination of the members of the first group.

12. A method for rendering a digital television broadcast, the method comprising the steps of:
receiving a plurality of components in a digital data stream that comprises a digital television broadcast;
determining whether the plurality of components includes a scoreboard;
determining whether there is at least one scoreboard preference stored that specifies at least one trigger and at least one corresponding action to be taken when particular information is present on a scoreboard that is included as one of the plurality of digital components;
if the plurality of components include a scoreboard, and if there is at least one stored scoreboard preference, rendering the plurality of components according to the at least one scoreboard preference and information on the scoreboard.

13. The method of claim 12 wherein the at least one trigger is selected from the first group:
clock running;
clock not running;
and wherein the corresponding action is selected from the second group:
mute;
unmute;
video blank;
video on;
record;
pause;
change channel;
return to selected channel;
change audio source;
return to selected audio source.

14. The method of claim 12 wherein the first group further comprises:
score change;
down calculation;
clock calculation;
yards calculation;
penalty flag;
no penalty flag; and
at least one heuristic combination of the members of the first group.

15. The method of claim 12 wherein the step of rendering the plurality of components according to the at least one scoreboard preference and the information on the scoreboard comprises the step of muting an audio signal when rendering at least one of the plurality of components.

16. The method of claim 12 wherein the step of rendering the plurality of components according to the at least one scoreboard preference and the information on the scoreboard comprises the step of pausing and resuming the recording of the digital television transmission based on scoreboard information.

* * * * *